United States Patent [19]
Nishikawa

[11] Patent Number: 5,463,610
[45] Date of Patent: Oct. 31, 1995

[54] TWO-BEAM OPTICAL HEAD FOR FORMING FIRST AND SECOND LIGHT SPOTS ON A RECORDING MEDIUM

[75] Inventor: Koichiro Nishikawa, Takasaki, Japan

[73] Assignee: Canon Kabushiki Kaisha, Tokyo, Japan

[21] Appl. No.: 222,872

[22] Filed: Apr. 5, 1994

[30] Foreign Application Priority Data

Apr. 22, 1993 [JP] Japan .................................. 5-117659

[51] Int. Cl.⁶ ................................. G11B 7/08; G11B 7/12
[52] U.S. Cl. ...................... 369/121; 369/112; 369/44.37; 369/44.38
[58] Field of Search ................................. 369/112, 121, 369/44.37, 116, 122, 44.38

[56] References Cited

U.S. PATENT DOCUMENTS

| | | | |
|---|---|---|---|
| 4,345,321 | 8/1982 | Arquie et al. | 369/112 |
| 4,517,667 | 5/1985 | Sprague | 369/122 |
| 4,888,759 | 12/1989 | Hazel et al. | 369/112 |
| 5,034,941 | 7/1991 | Kasai et al. | 369/112 |
| 5,093,821 | 3/1992 | Katayama et al. | 369/112 |

FOREIGN PATENT DOCUMENTS 58-220247  12/1983  Japan .
64-82348   3/1989   Japan .

Primary Examiner—David C. Nelms
Assistant Examiner—Tan Nguyen
Attorney, Agent, or Firm—Fitzpatrick, Cella, Harper & Scinto

[57] ABSTRACT

By using a two-beam optical head, simultaneous focusing of two light spots can be achieved and the execution of simultaneous erasure, recording and reproduction of information can be easily realized even in an inexpensive optical system which uses lenses having chromatic aberration. The two-beam optical head includes a monolithic semiconductor laser array having two light-emitting points which emit first and second light beams having different light intensities, and an optical system for forming first and second light spots on a magnetooptical disk. The two light beams pass along substantially the same optical path. The direction of the arrangement of the first and second light-emitting points of said light source unit is inclined with respect to a plane perpendicular to the optical axis of the optical system to focus the light spots on the same plane of the magnetooptical disk.

18 Claims, 4 Drawing Sheets

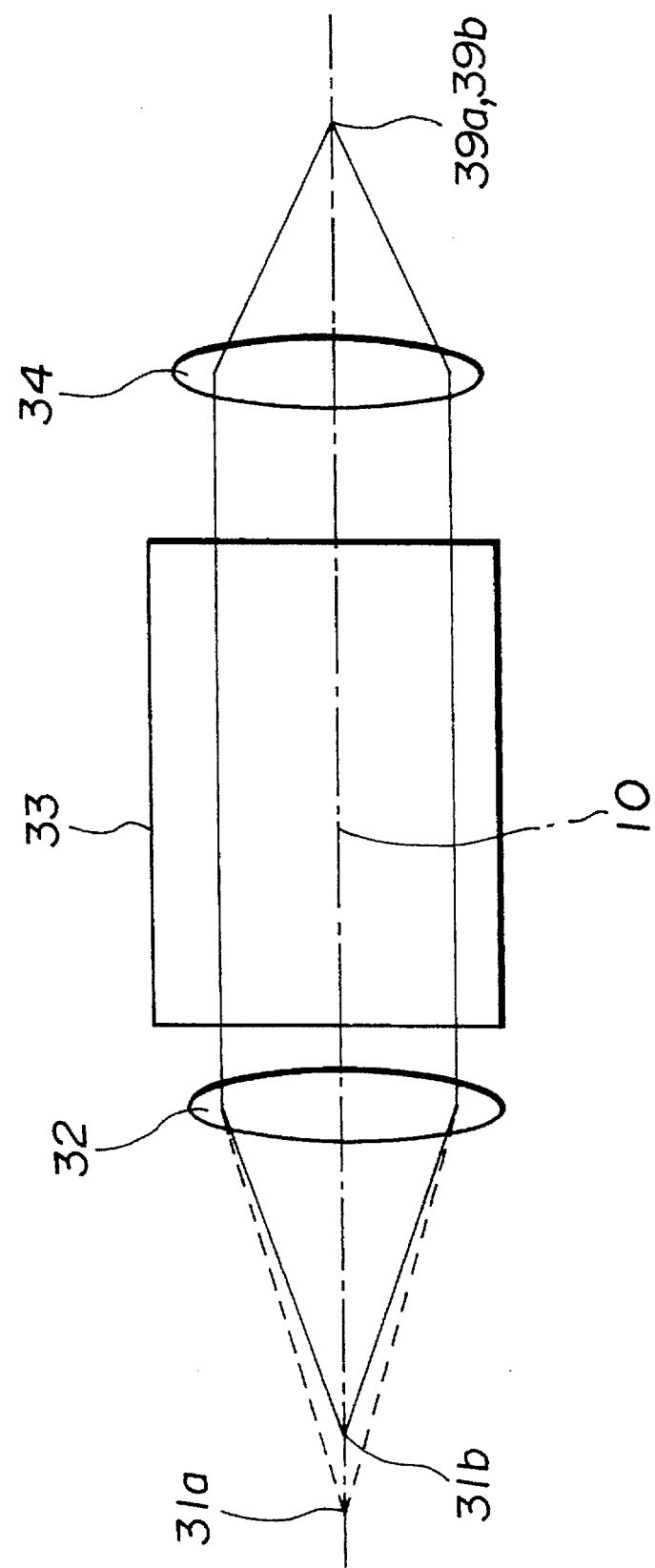

TWO-BEAM OPTICAL HEAD FOR FORMING FIRST AND SECOND LIGHT SPOTS ON A RECORDING MEDIUM

BACKGROUND OF THE INVENTION

1. Field of the Invention

This invention relates to a two-beam optical head. The two-beam optical head of the present invention is particularly suitable for simultaneously performing erasure, recording and reproduction of information by forming two light spots on a recording medium using a monolithic semiconductor laser array, which has two light-emitting points on the same substrate, as a light source.

2. Description of the Related Art

Magnetooptical-disk apparatuses are used as data file apparatuses utilizing the features of a large capacity, and non-contact and high-speed access. When an optical head emitting a single light beam is used in such an apparatus, usually, in order to record data, each of erasure of old information, recording of new information, and reproduction for confirming (verifying) the newly recorded information is performed during a single revolution of a magnetooptical disk. That is, the above-described three operations are completed only after three revolutions of the disk. Alternatively, erasure of old information and recording of new information are simultaneously performed during a single revolution of the disk, and verifying reproduction is performed during the next revolution of the disk. Accordingly, in such a conventional magnetooptical-disk apparatus, a waiting time for the revolutions of a magnetooptical disk is required, which is an obstacle for improving the data transfer speed.

In order to solve the above-described problem, optical heads, which can simultaneously perform erasure, recording and reproduction, or recording and reproduction by emitting a plurality of light beams, have been proposed, for example, in Japanese Patent Laid-open Application (Kokai) No. 58-220247 (1983) (corresponding to U.S. Pat. No. 4,517,887) and No. 64-82348 (1989). FIG. 1 is a schematic diagram of such a conventional optical head emitting a plurality of light beams.

In FIG. 1, monolithic semiconductor laser array 1 has a first light-emitting point 1a and second light-emitting point 1b on the same substrate. Linearly polarized light beams emitted from the respective emitting points are condensed onto magnetooptical disk 6 after passing through substantially the same optical path. That is, the respective light beams emitted from laser array 1 are made to be parallel light beams by collimating lens 2, are condensed by objective lens 4 after passing through beam splitter 3 having a beam shaping portion, and form two light spots 9a and 9b on information-recording surface 7 of magnetooptical disk 6. Light-emitting points 1a and 1b correspond to light spots 9a and 9b, respectively. The two light spots 9a and 9b are disposed so that the light spot 9a leads the light spot 9b on the same information track within information-recording surface 7 of magnetooptical disk 6 rotating in the direction of arrow 11. The light beams reflected by the information-recording surface 7 are condensed again by objective lens 4, are then deflected by beam splitter 3 having the beam shaping portion, and are guided to signal detection unit 8. Reference numeral 10 represents the optical axis of the optical system.

When recording data, light-emitting point 1a emits light so that light spot 9a has a power required for recording, light-emitting point 1b emits light so that light spot 9b has a power sufficient for reproduction, and a magnetic field modulated with data information is applied by an external magnetic head 12. At that time, a so-called information servo-signal for focusing and tracking, and an information-reproducing signal for verifying recording performed by light spot 9a are obtained from light spot 9b. Thus, erasure of old information, recording of new information, and reproduction for verifying the newly recorded information are simultaneously achieved.

In general, in an optical system as shown in FIG. 1, the efficiency of utilization of light of the optical system for advancing light is about 20–50%. The recording power is about 6–10 mW, and the reproducing power is about 1.5 mW. If it is assumed that the efficiency of utilization of light of the optical system for advancing light is 35%, the recording power is 8 mW, and the reproducing power is 1.5 mW, the outgoing power of first emitting point 1a and second emitting point 1b of monolithic semiconductor laser array 1 are 22.9 mW and 4.3 mW, respectively. The power dependency of a semiconductor laser wavelength is 0.1–0.3 nm/mW. If the value of the power dependency of semiconductor laser array 1 is assumed to be 0.2 nm/mW, the wavelength difference $\Delta\lambda$ between light beams from first light-emitting point 1a and second light-emitting point 1b of semiconductor laser array 1 is about 3.7 nm. In this case, if each of collimating lens 2 and objective lens 4 is assumed to be a single lens made of molded glass, there is a shift of $\Delta f$ between the imaging points by these lenses due to the chromatic aberration of the lenses, as shown in FIG. 2. In FIG. 2, the light beam having a longer wavelength is indicated by broken lines.

Since focus control is performed for reproducing light spot 9b, recording light spot 9a is defocused, whereby the performance of light spot 9a as a recording light spot is deteriorated. On the other hand, if each of collimating lens 2 and objective lens 4 is provided as a combination of a plurality of lenses in order to remove the chromatic aberration, the cost of the optical system increases, the weight of movable components is large, and therefore high-speed access cannot be performed.

SUMMARY OF THE INVENTION

The present invention has been made in consideration of the above-described problems.

It is an object of the present invention to provide a two-beam optical head, in which even in an inexpensive optical system using lenses having chromatic aberration, two light beams can be simultaneously focused, and simultaneous execution of erasure, recording and reproduction of information can be easily realized.

According to one aspect, the present invention which achieves the above-described object relates to a two-beam optical head comprising a light source unit including first and second light-emitting points for emitting first and second light beams, respectively, and an optical system for causing the two light beams to pass along substantially the same optical path to form first and second light spots on an information recording medium by the first and second light beams, respectively. The direction of the arrangement of the first and second light-emitting points of the light source unit is inclined with respect to a plane perpendicular to the optical axis of the optical system to focus the light spots on the same plane of the recording medium by the optical system.

The first and second light-emitting points may emit light beams having different light intensities.

The first and second light-emitting points may be two light-emitting points of a monolithic semiconductor laser array.

In another aspect, the present invention is directed to an apparatus for effecting at least one of the recording, reproducing and erasing of information on/from an information recording medium using the two-beam optical head discussed above.

The foregoing and other objects, advantages and features of the present invention will become more apparent from the following description of the preferred embodiment taken in conjunction with the accompanying drawings.

BRIEF DESCRIPTION OF THE DRAWINGS

FIG. 4 is a diagram illustrating the state of forming light spots in the two-beam optical head shown in FIG. 3.

Like reference numerals have been used for like or corresponding elements throughout the views.

DESCRIPTION OF THE PREFERRED EMBODIMENT

A preferred embodiment of the present invention will now be described with reference to the drawings.

Figure 1:
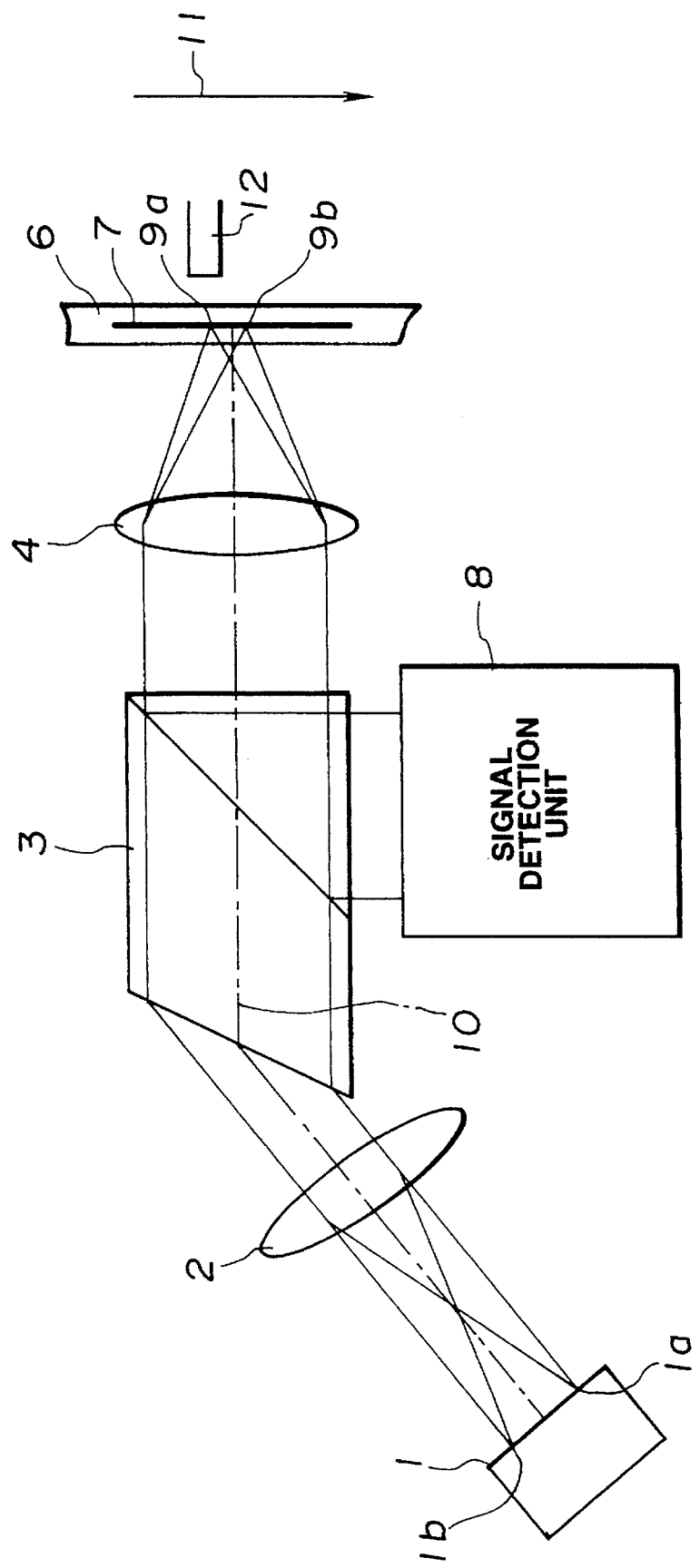
FIG. 1 is a diagram illustrating a conventional optical head emitting a plurality of light beams.
Figure 2:
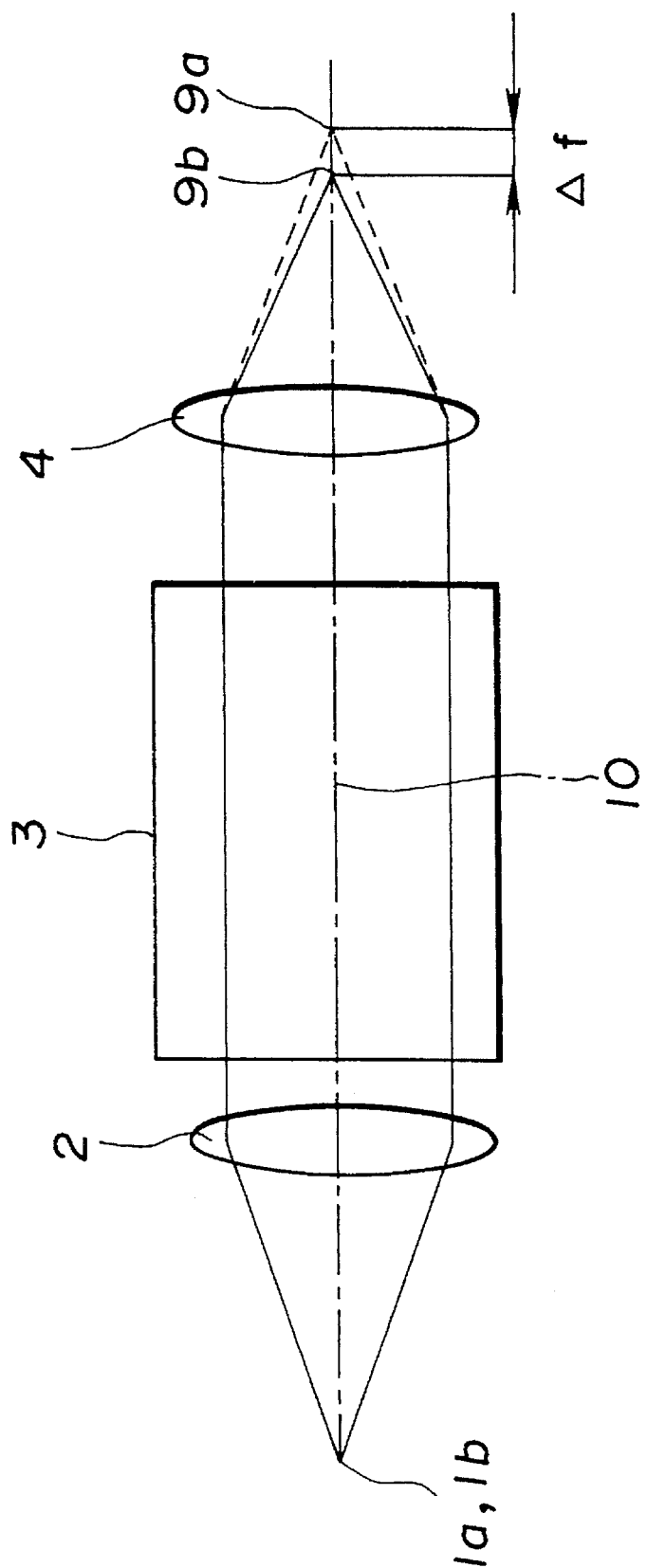
FIG. 2 is a diagram illustrating the state of forming light spots in the optical head shown in FIG. 1.
Figure 3:
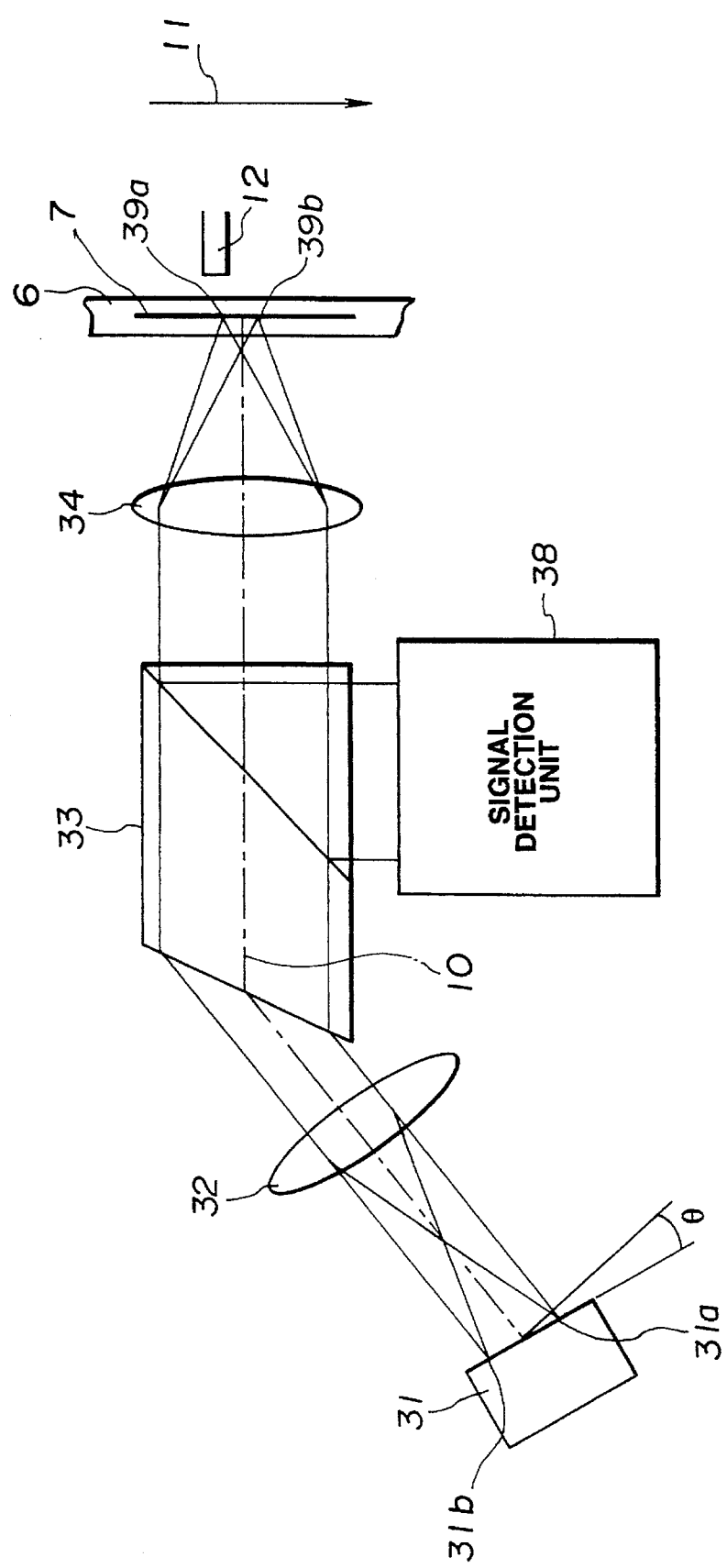
FIG. 3 is a diagram illustrating the configuration of a two-beam optical head according to an embodiment of the present invention.

FIG. 3 illustrates the configuration of a two-beam optical head according to the preferred embodiment.

In FIG. 3, monolithic semiconductor laser array 31 has first light-emitting point 31a and second light-emitting point 31b on the same substrate. These two light-emitting points are disposed so that the direction of the arrangement of the points is inclined by a predetermined angle θ with respect to a plane orthogonal to the optical axis 10 of the optical system. Linearly polarized light beams emitted from the respective emitting points are condensed onto magnetooptical disk 6, serving as an optical recording medium, after passing through substantially the same optical path. That is, the respective light beams emitted from laser array 31 are made to be parallel light beams by collimating lens 32, are condensed by objective lens 34 after passing through beam splitter 33 having a beam shaping portion, and form two light spots 39a and 39b on information-recording surface 7 of magnetooptical disk 6. Light-emitting points 31a and 31b correspond to light spots 39a and 39b, respectively.

The two light spots 39a and 39b are disposed so that the light spot 39a leads the light spot 39b on the same information track within information-recording surface 7 of magnetooptical disk 6 rotating in the direction of arrow 11. The light beams reflected by the information-recording surface 7 are condensed again by objective lens 34, are then deflected by beam splitter 33 having the beam shaping portion, and are guided to signal detection unit 38.

When recording data, light-emitting point 31a emits light so that light spot 39a has a power required for recording, light-emitting point 31b emits light so that light spot 39b has a power sufficient for reproduction, which is lower than the recording power, and a magnetic field modulated with data information is applied by an external magnetic head 12. At that time, a so-called information servo-signal for focusing and tracking, and information-reproducing signal for verifying recording performed by light spot 39a are obtained from light spot 39b. Thus, erasure of old information, recording of new information, and reproduction for verifying the newly recorded information are simultaneously achieved.

As described above, first light-emitting point 31a and second light-emitting point 31b of laser array 31 emit light beams having different light intensities.

Signal detection unit 38 receives the light beam of light spot 39b reflected by information-recording surface 7 of magnetooptical disk 6 to detect information relating to focusing error and tracking error between optical head 31 and an information track of magnetooptical disk 6, and to obtain a reproducing signal of information recorded by light spot 39a.

First light-emitting point 31a and second light-emitting point 31b are separated so as to maintain substantially the same distance from the optical axis 10 of the optical system in opposite directions. Light spot 39a and light spot 39b are separated in the same manner. That is, the curvature of field possessed by collimating lens 32 and objective lens 34 causes no problem.

The value of the angle of inclination θ will now be explained in detail. The interval between the light-emitting points is represented by d, the focal length and the chromatic aberration of collimating lens 32 are represented by $f_c$ and α (mm/nm), respectively, the beam shaping ratio of beam splitter 33 is represented by m, the focal length and the chromatic aberration of objective lens 34 are represented by $f_c$ and β (mm/nm), respectively, and the wavelength difference between first light-emitting point 31a and second light-emitting point 31b is represented by Δλ. The amount of defocus of light spot 39a will be considered, assuming that focus control is performed for light spot 39b. If the amount of defocus at the collimating lens 32 is represented by $\Delta d_c$, $$\Delta d_c = \alpha \cdot \Delta \lambda.$$

If the amount of defocus at the objective lens 34 is represented by $\Delta d_0$, $$\Delta d_0 = \beta \cdot \Delta \lambda.$$

In the entire optical system, if the amount of defocus at the side of the magnetooptical disk is represented by Δf, the following expression holds:

$$\Delta f = [\{(f_0/f_c)^2 + (f_0/mf_c)^2\}/2] \Delta d_c + \Delta d_0,$$

since beam shaping having a magnification value m is performed in mid-course of the optical system.

If monolithic semiconductor laser array 31 is inclined by an angle θ relative to a plane perpendicular to the optical axis 10 of the optical system within the plane in which beam shaping is performed as shown in FIG. 3, the following expression holds:

$$\Delta d_c = \alpha \cdot \Delta \lambda - d \cdot \sin \theta.$$

Hence, $f = [\{(f_0/f_c)^2 + (f_0/mf_c)^2\}/2](\alpha \cdot \Delta\lambda - d \cdot \sin \theta) + \beta \cdot \Delta\lambda$, and $\theta = \arcsin \{\alpha \cdot \Delta\lambda/d + (2/A/d)\beta \cdot \Delta\lambda\}$.

If $A = \{(f_0/f_c)^2 + (f_0/mf_c)^2\}$, Δf=0. That is, as shown in FIG. 4, light spot 39a and light spot 39b are situated without shifting from each other in the direction of the optical axis 10 of the optical system.

In the present embodiment, the values of the optical system and the wavelength difference during recording are preferred to be as follows. That is, the interval between the light-emitting points is d=0.1 (mm), the focal length of collimating lens 32 is $f_c$=8 (mm), the chromatic aberration of collimating lens 32 is α=0.0003 (mm/nm), the beam shaping ratio is m=2, the focal length of objective lens 34 is $f_0$=4 (mm), the chromatic aberration of objective lens 34 is β=0.0001 (mm/nm), and the wavelength difference is Δλ=3 (nm). Accordingly, θ=1.6 (degrees), and monolithic semiconductor laser array 31 is inclined by this angle, as shown in FIG. 3. However, the present invention is not limited to these values.

When one of the two light-emitting points 31a and 31b, and one of the light spots 9a and 9b are present on the optical axis 10, and each of the other of the two light emitting points and the other light spot has an angle of view and a curvature of field, if the curvature of field of the light-emitting point having the angle of view at the collimating lens 32 is represented by γ, and the curvature of field of the light spot corresponding to this light-emitting point at the objective lens 34 is represented by δ, the value of θ can be determined by replacing $\Delta d_c$=α·Δλ and $\Delta d_0$=β·Δλ with $\Delta d_c$=α·Δλ+γ and $\Delta d_0$=β·Δλ+δ, and the state of Δf=0 can be achieved.

In the present embodiment, as shown in FIG. 3, laser array 31 is inclined so that first light-emitting point 31a used for recording, i.e., the light-emitting point having a larger power of the two light-emitting points 31a and 31b, is separated from collimating lens 32.

The present invention is not limited to the above-described embodiment, but may also be applied to a phase-change-type optical-disk apparatus or an optical-card apparatus.

As described above, according to the present invention, since the amount of defocus caused by the wavelength difference between the two light beams and the chromatic aberration of the optical system can be canceled, even an inexpensive optical system using lenses having chromatic aberrations can achieve simultaneous focusing of two light spots having different powers, and the execution of simultaneous erasure, recording and reproduction, and high-speed access can easily be realized.

Except as otherwise disclosed herein, the various components shown in outline or in block form in the Figures are individually well known and their internal construction and operation is not critical either to the making or using of this invention or to a description of the best mode of the invention.

While the present invention has been described with respect to what is presently considered to be the preferred embodiment, it is to be understood that the invention is not limited to the disclosed embodiment. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A two-beam optical head comprising:

a light source unit including first and second light-emitting points for emitting first and second light beams, respectively, the first and second light beams having a wavelength difference Δλ therebetween;

an optical system, having a chromatic aberration, for causing the two light beams to pass along substantially a common optical path, and for forming first and second light spots on an information recording medium by the first and second light beams, respectively, said light source unit being inclined with respect to a plane perpendicular to an optical axis of said optical system to focus the light spots on a common plane of the recording medium by said optical system.

2. A two-beam optical head according to claim 1, wherein the first and second light-emitting points emit light beams having different light intensities.

3. A two-beam optical head according to claim 1, wherein the first and second light-emitting points are two light-emitting points of a monolithic semiconductor laser array.

4. A two-beam optical head according to claim 1, wherein said first and second light-emitting points are separated so as to maintain substantially the same distance from the optical axis of said optical system in opposite directions.

5. A two-beam optical head according to claim 1, wherein the first and second light spots are separated so as to maintain substantially the same distance from the optical axis of said optical system in opposite directions.

6. A two-beam optical head according to claim 1, wherein the first light-emitting point emits a light beam having a larger light intensity than that emitted at the second light-emitting point, and a direction of arrangement of the first and second light-emitting points is inclined with respect to a plane perpendicular to the optical axis of said optical system to separate the first light-emitting point from said optical system.

7. An apparatus for effecting at least one of recording, reproducing and erasing of information on/from an information recording medium, said apparatus comprising:

a light source unit including first and second light-emitting points for emitting first and second light beams, respectively, the first and second light beams having a wavelength difference Δλ therebetween; and an optical system, having a chromatic aberration, for causing the two light beams to pass along substantially a common optical path, and for forming first and second light spots on an information recording medium by the first and second light beams, respectively, said light source unit being inclined with respect to a plane perpendicular to an optical axis of said optical system to focus the light spots on a common plane of the recording medium by said optical system to effect at least one of recording, reproducing and erasing of information on/from the recording medium.

8. An apparatus according to claim 7, wherein the first and second light-emitting points emit light beams having different light intensities.

9. An apparatus according to claim 7, wherein the first and second light-emitting points are two light-emitting points of a monolithic semiconductor laser array.

10. An apparatus according to claim 7, wherein the first and second light-emitting points are separated so as to maintain substantially the same distance from the optical axis of said optical system in opposite directions.

11. An apparatus according to claim 7, wherein the first and second light spots are separated so as to maintain substantially the same distance from the optical axis of said optical system in opposite directions.

12. An apparatus according to claim 7, wherein the first light-emitting point emits a light beam having a larger light intensity than that emitted at the second light-emitting point, and a direction of arrangement of the first and second light-emitting points is inclined with respect to a plane perpendicular to the optical axis of said optical system to separate the first light-emitting point from said optical 13. A method of forming a light spot in a two-beam optical head comprising the steps of:

emitting a first light beam at a first light-emitting point;

emitting a second light beam having a wavelength difference $\Delta\lambda$ with respect to the first light beam, at a second light-emitting point;

condensing the first and second light beams, using an optical system having a chromatic aberration, and forming first and second light spots on an information recording medium; and inclining a direction of arrangement of the first and second light spots with respect to a plane perpendicular to an optical axis of the optical system.

14. A method according to claim 13, wherein the first and second light-emitting points emit light beams having different light intensities.

15. A method according to claim 13, wherein the first and second light-emitting points are two light-emitting points of a monolithic semiconductor laser array.

16. A method according to claim 13, wherein the first and second light-emitting points are separated so as to maintain substantially the same distance from the optical axis of the optical system in opposite directions.

17. A method according to claim 13, wherein the first and second light spots are separated so as to maintain substantially the same distance from the optical axis of the optical system in opposite directions.

18. A method according to claim 13, wherein the first light-emitting point emits a light beam having a larger light intensity than that emitted at the second light-emitting point, and a direction of arrangement of the first and second light-emitting points is inclined with respect to a plane perpendicular to the optical axis of the optical system to separate the first light-emitting point from the optical system.

* * * * *

UNITED STATES PATENT AND TRADEMARK OFFICE
CERTIFICATE OF CORRECTION

PATENT NO. : 5,463,610
DATED : October 31, 1995
INVENTOR(S) : KOICHIRO NISHIKAWA It is certified that error appears in the above-indentified patent and that said Letters Patent is hereby corrected as shown below:

COLUMN 1:

Line 48, "887)" should read --667)--.

COLUMN 4:

Line 33, "$f_c$" should read --$f_o$--.

Signed and Sealed this

Thirtieth Day of January, 1996

Attest:

BRUCE LEHMAN

Attesting Officer     Commissioner of Patents and Trademarks